(12) United States Patent
Nimura et al.

(10) Patent No.: US 9,317,248 B2
(45) Date of Patent: Apr. 19, 2016

(54) INFORMATION PROCESSING DEVICE, SUBSYSTEM, INFORMATION PROCESSING METHOD, AND RECORDING MEDIUM STORING INFORMATION PROCESSING PROGRAM

(71) Applicant: FUJITSU LIMITED, Kawasaki-shi, Kanagawa (JP)

(72) Inventors: Kazuaki Nimura, Kawasaki (JP); Hidenobu Ito, Kawasaki (JP); Koichi Yasaki, Kawasaki (JP); Yosuke Nakamura, Kawasaki (JP); Zhaogong Guo, Koto (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/974,404

(22) Filed: Aug. 23, 2013

(65) Prior Publication Data

US 2013/0346648 A1    Dec. 26, 2013

Related U.S. Application Data

(63) Continuation of application No. PCT/JP2011/063078, filed on Jun. 7, 2011.

(30) Foreign Application Priority Data

Mar. 29, 2011   (JP) .................................. 2011-073465

(51) Int. Cl.
*G06F 1/26* (2006.01)
*G06F 1/32* (2006.01)
(Continued)

(52) U.S. Cl.
CPC ................ *G06F 5/065* (2013.01); *G06F 1/266* (2013.01); *G06F 1/3206* (2013.01); *G06F 2221/2105* (2013.01); *H04W 52/0225* (2013.01)

(58) Field of Classification Search
CPC ....... G06F 5/065; G06F 1/266; G06F 1/3206; G06F 2221/2105; H04W 52/0225
See application file for complete search history.

(56) References Cited

U.S. PATENT DOCUMENTS 6,337,905 B1 *   1/2002   Mizuta et al. ............ 379/265.02
7,877,521 B2 *   1/2011   Suzuki et al. .................. 710/10
(Continued)

FOREIGN PATENT DOCUMENTS

EP   2 131 265 A2   12/2009
JP   6-268641       9/1994
(Continued)

OTHER PUBLICATIONS

International Search Report mailed Jul. 5, 2011 in corresponding International Application No. PCT/JP2011/063078.
(Continued)

*Primary Examiner* — Eric Oberly
(74) *Attorney, Agent, or Firm* — Staas & Halsey LLP

(57) ABSTRACT

An information processing device capable of performing external communication through a communication device for performing communication includes a subsystem arranged between the communication device and a main unit of the information processing device including a central processing unit and an operating system. The subsystem temporarily stores communication data between the communication device and the central processing unit when the central processing unit is in a power source turned-off state or a suspended state, and the subsystem transfers the communication data between the communication device and the central processing unit when the central processing unit is in a power source turned-on state. Accordingly, external communication is enabled without altering the connection manager of the OS even when the subsystem is placed between the communication device and the OS.

10 Claims, 19 Drawing Sheets

(51) Int. Cl.
 *G06F 5/06* (2006.01)
 *H04W 52/02* (2009.01)

(56) References Cited

U.S. PATENT DOCUMENTS

| | | | |
|---|---|---|---|
| 2006/0116166 A1 | 6/2006 | Hibino | |
| 2006/0161639 A1* | 7/2006 | Kato | 709/219 |
| 2007/0130268 A1 | 6/2007 | Tsuji | |
| 2008/0291941 A1* | 11/2008 | Sakai | G06F 9/545 370/469 |
| 2009/0063722 A1 | 3/2009 | Uno | |
| 2009/0086660 A1 | 4/2009 | Sood et al. | |
| 2010/0023788 A1 | 1/2010 | Scott et al. | |

FOREIGN PATENT DOCUMENTS

| | | |
|---|---|---|
| JP | 2006-155509 | 6/2006 |
| JP | 2007-148908 | 6/2007 |
| JP | 2009-59087 | 3/2009 |

OTHER PUBLICATIONS http://pr.fujitsu.com/jp/news/2009/08/24.html.
Fujitsu Limited, "PC Equipped with a Loss/Theft Countermeasure Solution "Clearsure" for Laptop PC Released Information Leak Prevented Through Remote Control", Press Release (Ubiquitous Products), Aug. 24, 2009, pp. 1-6.
PCT International Preliminary Report on Patentability mailed Oct. 10, 2013 in corresponding International Application No. PCT/JP2011/063078.
PCT International Preliminary Report on Patentability mailed Oct. 10, 2013 in corresponding International Application No. PCT/JP2011/063.
Extended European Search Report dated Nov. 4, 2015 in corresponding European Patent Application No. 11862517.7.
Agarwal et al., "Somniloquy: Maintaining Network Connectivity While Your Computer Sleeps", Microsoft, Mar. 2008, 14 pp.

* cited by examiner

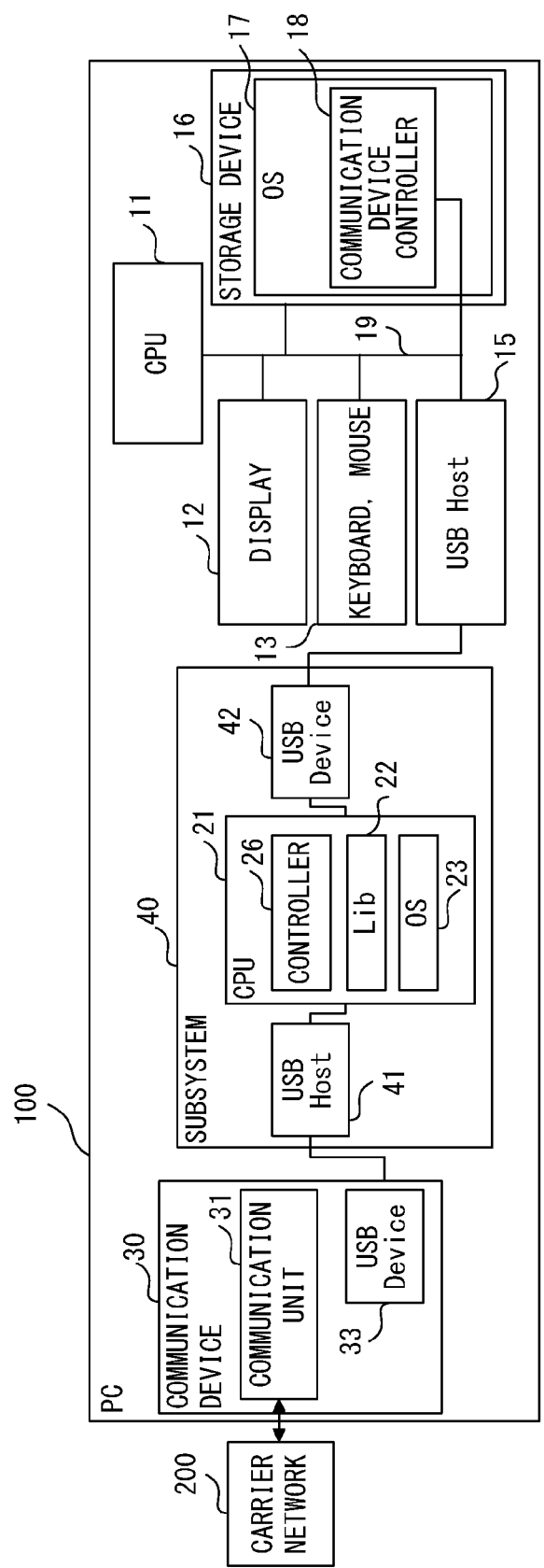
F I G. 3

| MESSAGE HEADER | SUBSYSTEM ID | SERVER ID | SEQUENCE NUMBER | PC Wake FLAG | DELETION FLAG | DOWNLOAD FLAG | DOWNLOAD FLAG |
|---|---|---|---|---|---|---|---|

F I G. 9

| MESSAGE HEADER | SUBSYSTEM ID | SERVER ID | SEQUENCE NUMBER | ACK |
|---|---|---|---|---|

F I G. 1 0

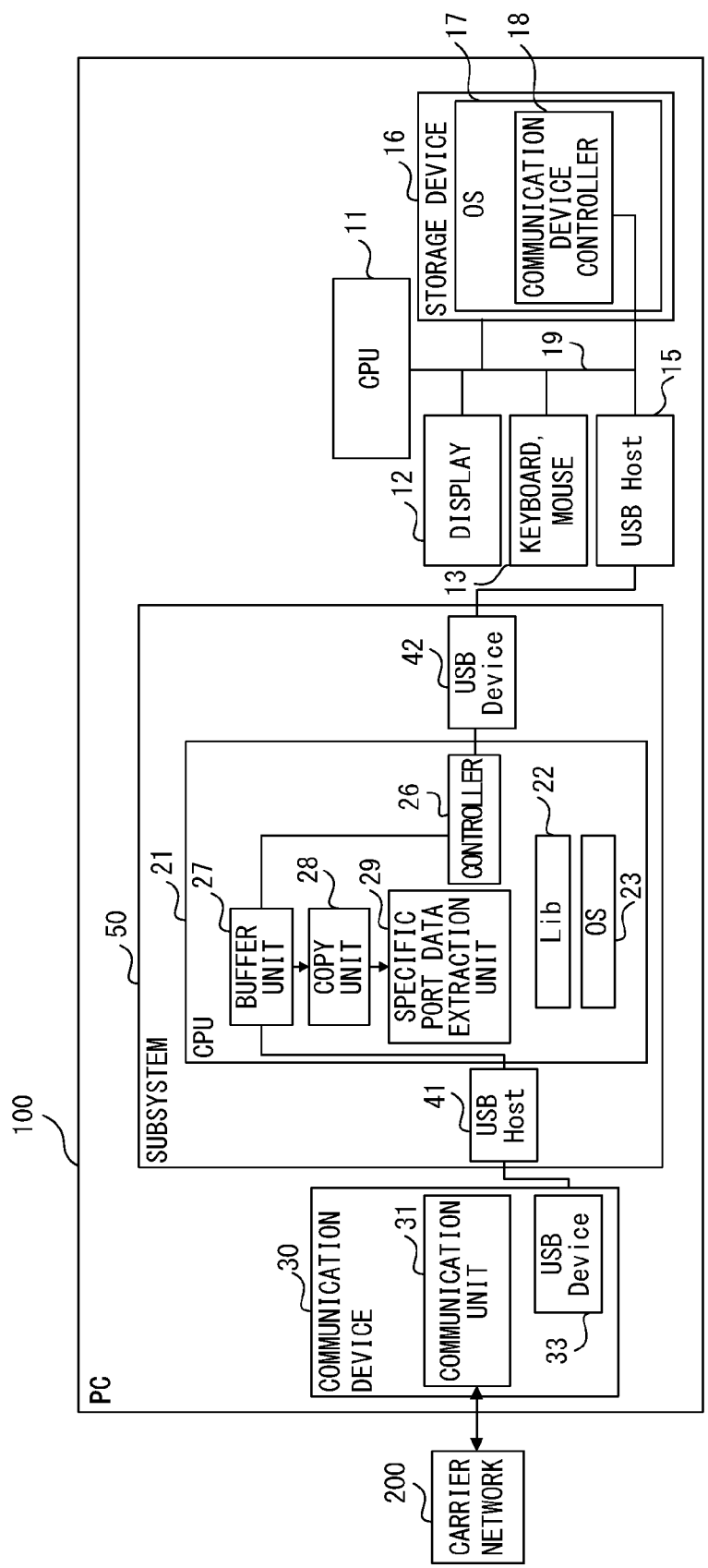
F I G. 16

INFORMATION PROCESSING DEVICE, SUBSYSTEM, INFORMATION PROCESSING METHOD, AND RECORDING MEDIUM STORING INFORMATION PROCESSING PROGRAM

CROSS-REFERENCE TO RELATED APPLICATION

This application is a continuation of and claims the benefit of International Application No. PCT/JP2011/063078 filed on Jun. 7, 2011, and claims the benefit of Japanese Patent Application No. 2011-073465, filed on Mar. 29, 2011, the disclosures of both of which are incorporated herein by reference.

FIELD

The present invention relates to an information processing device that performs communication through a communication line, a subsystem provided for the information processing device, an information processing method, and an information processing program. In particular, the present invention relates to a subsystem arranged between an operating system and a communication device so as to enable communication in a power source turned-off state or a suspended state, an information processing device provided with the subsystem, an information processing method, and an information processing program.

BACKGROUND

Conventionally, there have been some cases in which information processing devices as represented by desktop or laptop PCs (Personal Computer) have been equipped with a communication device with a communication protocol such as 3GPP (3rd Generation Partnership Project) or WiMAX (Worldwide Interoperability for Microwave Access [IEEE 802.16a]), and such information processing devices have been used for communications such as via the Internet.

In such PCs, communication devices are classified into two types, external devices and internal devices.

External-type communication devices are inserted into a communication interface such as a USB (Universal Serial Bus) that is provided for PCs. Then, a device driver and a connection manager as an application for managing the connection that is responsible for communication are installed in the OS (Operating System) of the PC, and communication such as the Internet communication is performed by establishing a communication connection. The connection manager not only manages communication connection, but also manages communication disconnection or manages and displays a communication state or the like.

Internal-type communication devices establish connection with communication devices via an interface such as USB or PCI (Peripheral Component Interconnect)-Express, and perform communication by using a connection manager.

FIG. 1 illustrates a general outline of a conventional personal computer with a communication device.

In FIG. 1, a personal computer (PC) 100 as an information processing device includes a CPU 11 (Central Processing Unit), a display device 12 such as a display that displays some data or information, an input device 13 such as a keyboard or mouse by which some data or commands are input, an interface (I/F) device 14, a storage device 16 such as a RAM (Random Access Memory) as a rewritable memory or a ROM (Read Only Memory) as a nonvolatile memory, and a communication device controller 18, and these elements are connected to a bus 19. The storage device 16 includes an OS 17, and stores various kinds of control programs or data.

The PC 100 includes a communication device 30 provided with a communication unit 31 and an interface (I/F) device 32, and may be connected to a carrier network 200 outside the PC 100 through an I/F device 32 and an I/F device 14 by using the communication unit 31.

In regard to the communication device 30, an external device is different from an internal device in that an internal device is used in a state where a certain PC 100 is always associated with a specific communication device 30, i.e., in a state where the PC 100 and the communication device 30 are in a one-to-one relationship. However, as long as a user always uses the PC 100 with the communication device 30 attached, it is possible to assume a one-to-one relationship even when the communication device 30 is an external device.

A subsystem that maintains a communication state even when the CPU 11 of such a PC 100 is in a power source turned-off state or a suspended state, that is provided with a CPU independent of the CPU 11 provided for the PC 100, and that provides a network service may be additionally provided (see, for example, Patent Document 1 and Non-Patent Document 1).

FIG. 2 illustrates a general outline of a conventional personal computer with a subsystem.

In the PC 100 of FIG. 2, a subsystem 20 is arranged between the communication device 30 and a main unit of the personal computer provided with the CPU 11, the display device 12, the input device 13, the I/F device 14, the storage device 16 in which an OS or the like is stored, and the communication device controller 18, which are connected via the bus 19.

The subsystem 20 is provided with a CPU 21, a library (Lib) 22 in which various kinds of functions and program subroutines are stored, an OS 23, an interface (I/F) device 24, and an interface (I/F) device 25.

The subsystem 20 as above may be arranged independently from the PC 100 and the communication device 30, or the functionality may be integrated into the PC 100 or the communication device 30.

When the subsystem 20 is independently arranged, there is an advantageous effect whereby functionality may be provided or realized without relying on communication device manufacturers or PC manufacturers. In other words, even when the communication device 30 is renewed, the functionality may be used continuously by migrating the independent subsystem 20. In the configuration of the independent subsystem 20 as above, the subsystem 20 is additionally provided by a bus connection between the PC 100 and the communication device 30.

Some external devices are like mobile routers. Mobile routers obtain carrier communication services such as 3GPP and WiMAX, and connect to the PC 100 by using an interface such as a LAN (Local Area Network) and Wi-Fi (Wireless Fidelity). Because a mobile router is recognized as a LAN or Wi-Fi device on the PC 100 side when connection with the PC 100 is established by LAN or Wi-Fi, the connection on the PC 100 side is managed by a LAN driver, a Wi-Fi driver, and connection management software. For this reason, the above connection manager is not used.

The subsystem 20 provides services such as "PUSH" or download by which information is automatically sent from an external server through the carrier network 200 even when the CPU 11 is in a power source turned-off state or a suspended state. Accordingly, when a user wishes to use the PC 100 after a certain event occurs and then PUSH notification is received or when the user only wishes to download a large file, it is expected that the power consumption of the PC 100 will be reduced in total by letting the subsystem 20 provided with a communication facility and minimum functionality such as a storage function perform the processes.

DOCUMENTS OF PRIOR ART

Patent Document

Patent Document 1: Japanese Laid-open Patent Publication No. 06-268641

Non-Patent Document

Non-Patent Document 1: http://pr.fujitsu.com/jp/news/2009/08/24.html

SUMMARY

However, even if the subsystem 20 independent of the communication device 30 is inserted into a communication interface of the PC 100, the subsystem 20 may not be recognized by the OS 17 of the PC 100 as the communication device 30. Thus, there has been a problem wherein the communication may be controlled by a connection manager (the communication device controller 18) of the OS 17.

In order to solve the above problems, the present invention adopts the following configuration.

In one aspect of an information processing device, an information processing device is capable of performing external communication through a communication device for performing communication, and the information processing device includes a subsystem arranged between the communication device and a main unit of the information processing device, including a central processing unit and an operating system. The subsystem temporarily stores communication data between the communication device and the central processing unit when the central processing unit is in a power source turned-off state or a suspended state, and the subsystem transfers the communication data between the communication device and the central processing unit when the central processing unit is in a power source turned-on state.

The object and advantages of the invention will be realized and attained by means of the elements and combinations particularly pointed out in the claims.

It is to be understood that both the forgoing general description and the following detailed description are exemplary and explanatory and are not restrictive of the invention.

BRIEF DESCRIPTION OF DRAWINGS

FIG. 3 illustrates a general outline of a personal computer according to the first embodiment.

FIG. 9 illustrates an example of a packet of an AT command sent from an OS 17 to a subsystem 40.

FIG. 10 illustrates an example of a packet of a reply command sent from a subsystem 40 to an OS 17.

FIG. 16 illustrates a general outline of a personal computer according to the second embodiment.

DESCRIPTION OF EMBODIMENTS

Figure 1:
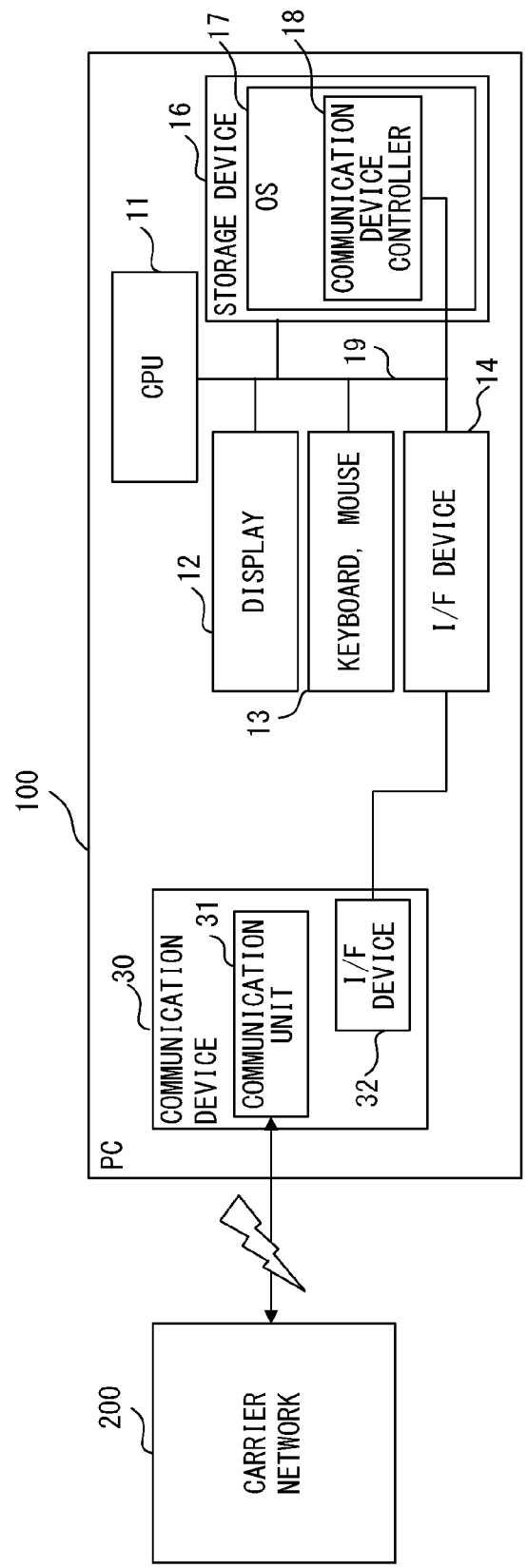
FIG. 1 illustrates a general outline of a conventional personal computer with a communication device.
Figure 2:
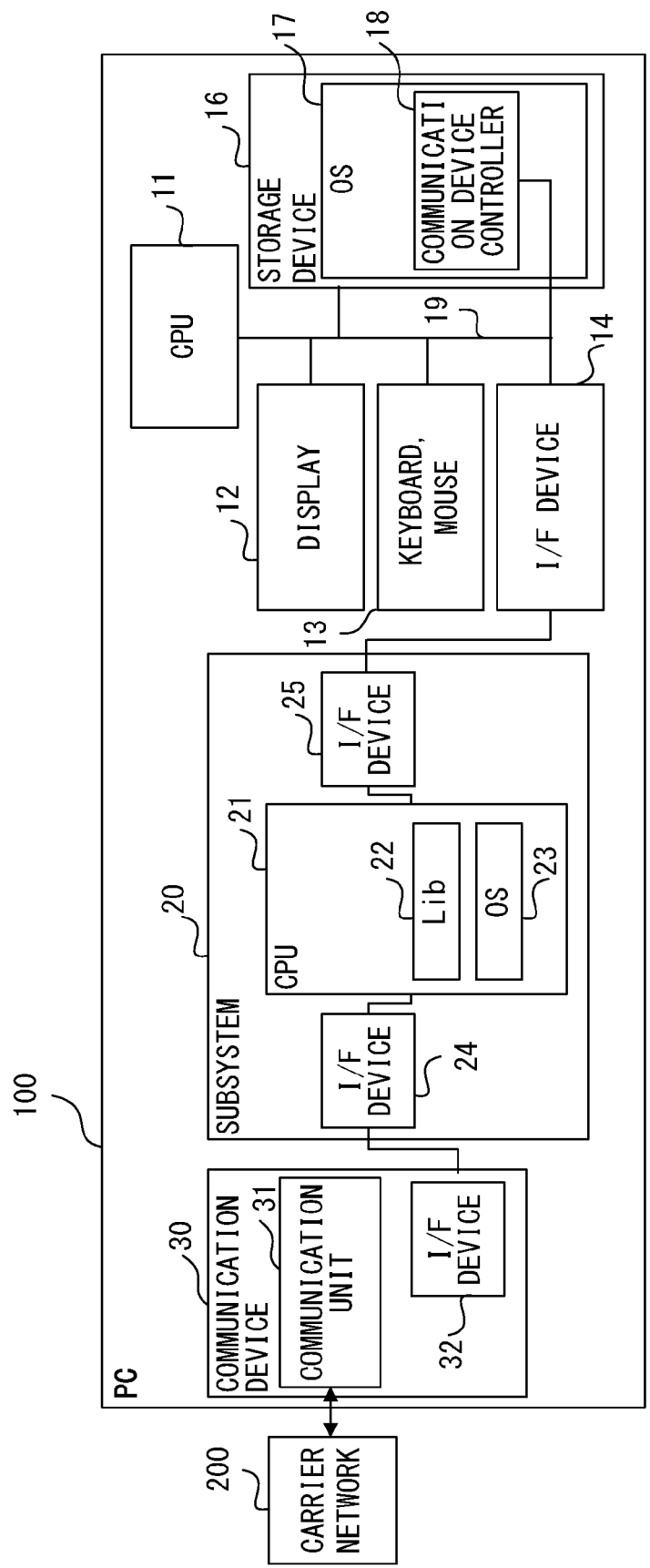
FIG. 2 illustrates a general outline of a conventional personal computer with a subsystem.

Some embodiments of the present invention will be described below in detail with reference to the drawings.

(First Embodiment)

FIG. 3 illustrates a general outline of a personal computer according to the first embodiment.

In FIG. 3, a personal computer (PC) 100 as an information processing device includes a CPU 11, a display device 12 such as a display that displays some data or information, an input device 13 such as a keyboard or mouse by which some data or commands are input, a USB host 15 as an I/F device, a storage device 16 such as a RAM as a rewritable memory or a ROM as a nonvolatile memory, and a communication device controller 18, and these elements are connected to a bus 19. The storage device 16 includes an OS 17, and stores various kinds of control programs or data.

The PC 100 includes a communication device 30 provided with a communication unit 31 and a USB device 33 as an I/F device, and may connect to a carrier network 200 outside the PC 110 through the USB device 33 and the USB host 15 by using the communication unit 31. The PC 100 includes a subsystem 40 between a main unit of the personal computer provided with the communication device controller 18 or the like connected through the bus 19 and the communication device 30.

The communication device 30 holds the data referred to as a descriptor, which can be a class, an ID, a name, and several kinds of set values in the memory of the integrated USB device 33. The descriptor is sent to the PC 100 side when the communication device 30 is connected to the PC 100, thereby establishing connection between the PC 100 and the communication device 30.

Here, the three states to which the subsystem 40 may belong according to the operations of the OS 17 and the state transition in the PC 100 as above will be described.

Figure 4:
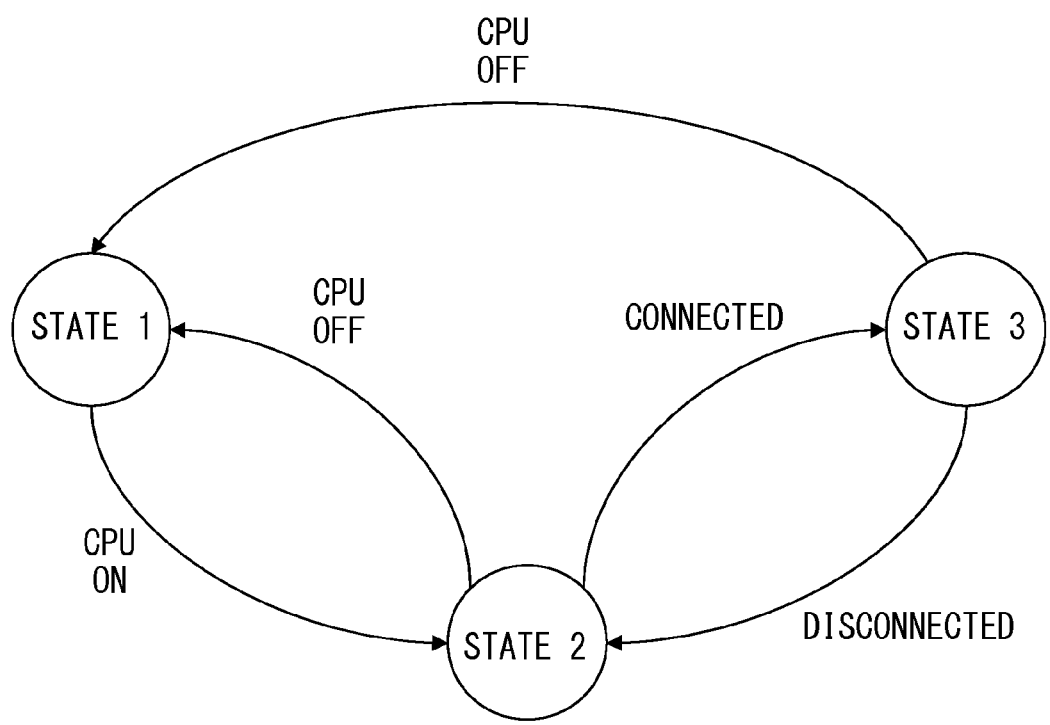
FIG. 4 illustrates the three states to which a subsystem 40 may belong and the state transition.

FIG. 4 illustrates the three states to which the subsystem 40 may belong and the state transition.

In FIG. 4, a state 1 indicates that the CPU 11 is in a power source turned-off state or a suspended state, and that only the subsystem 40 is functioning.

A state 2 indicates that the subsystem 40 is functioning and the CPU 11 is operating, but indicates that a network connection is not established by the communication device controller 18. As the CPU 11 starts operating, the state shifts from the state 1 to the state 2. The operation of the CPU 11 may be initiated via manipulation by a user, or may be initiated by a request from an application program. Conversely, the state shifts from the state 2 to the state 1 when the CPU 11 shifts to a power source turned-off state or a suspended state.

A state 3 indicates that not only is the subsystem 40 functioning but also the CPU 11 is operating, and further indicates that a network connection has been established by the communication device controller 18. Because a network connection available to the CPU 11 is established, the state shifts from the state 2 to the state 3. A connection to the network is established via an operation by a user, as will be described later. Conversely, the state shifts from the state 3 to the state 2 when a disconnection from the network is performed due to an instruction given by a user, as will be described later.

There are some cases in which the state shifts from the state 3 to the state 1 when the CPU 11 shifts to a power source turned-off state or a suspended state while the network connection is established. Note that the load on the subsystem 40 is greater when the subsystem 40 is in the state 2 than when the subsystem 40 is in the state 1. Further, the load on the subsystem 40 is greater when the subsystem 40 is in the state 3 than when the subsystem 40 is in the state 2.

The present invention is applied to the transition between the state 2 and the state 3, and the relationship between the state 2 and the state 3 is assumed in the following description unless otherwise specified.

Return to the description with respect to FIG. 3. The subsystem 40 includes a CPU 21, a library (Lib) 22 in which various kinds of functions and program subroutines are stored, an OS 23, a USB host 41 as an I/F device, a USB device 42 as an I/F device, and a controller 26. When the CPU 11 is in a power source turned-off state or a suspended state, the subsystem 40 temporarily stores the communication data between the communication device 30 and the CPU 11. When the CPU 11 is in a power source turned-off state, the subsystem 40 transfers the communication data between the communication device 30 and the CPU 11.

The controller 26 has a descriptor copy function by which a descriptor in which the information of the communication device 30 is stored is read from the memory of the USB device 33 in the communication device 30 when the subsystem 40 starts operating and the read information is stored in the memory of the USB device 42 in the subsystem 40.

The controller 26 connects the USB host 41 with the USB device 42, and transfers the communication data between the communication device controller 18 and the communication device 30 provided for the PC 100.

Moreover, the controller 26 has a pseudo responsive function by which a pseudo response is made to the communication device controller 18 in response to a request from the communication device controller 18 as a substitute for a response by the communication device 30, simulating a response by the communication device 30. For example, when a communication connection request (Connect) to the communication device 30 is sent from the communication device controller 18 to the communication device 30, "OK" is sent in return. When a communication disconnection request (Disconnect) is received, "OK" is sent in return. Further, in PPP (Point to Point Protocol) connection, "OK" is sent in response to a connection request and an authentication request.

Figure 5:
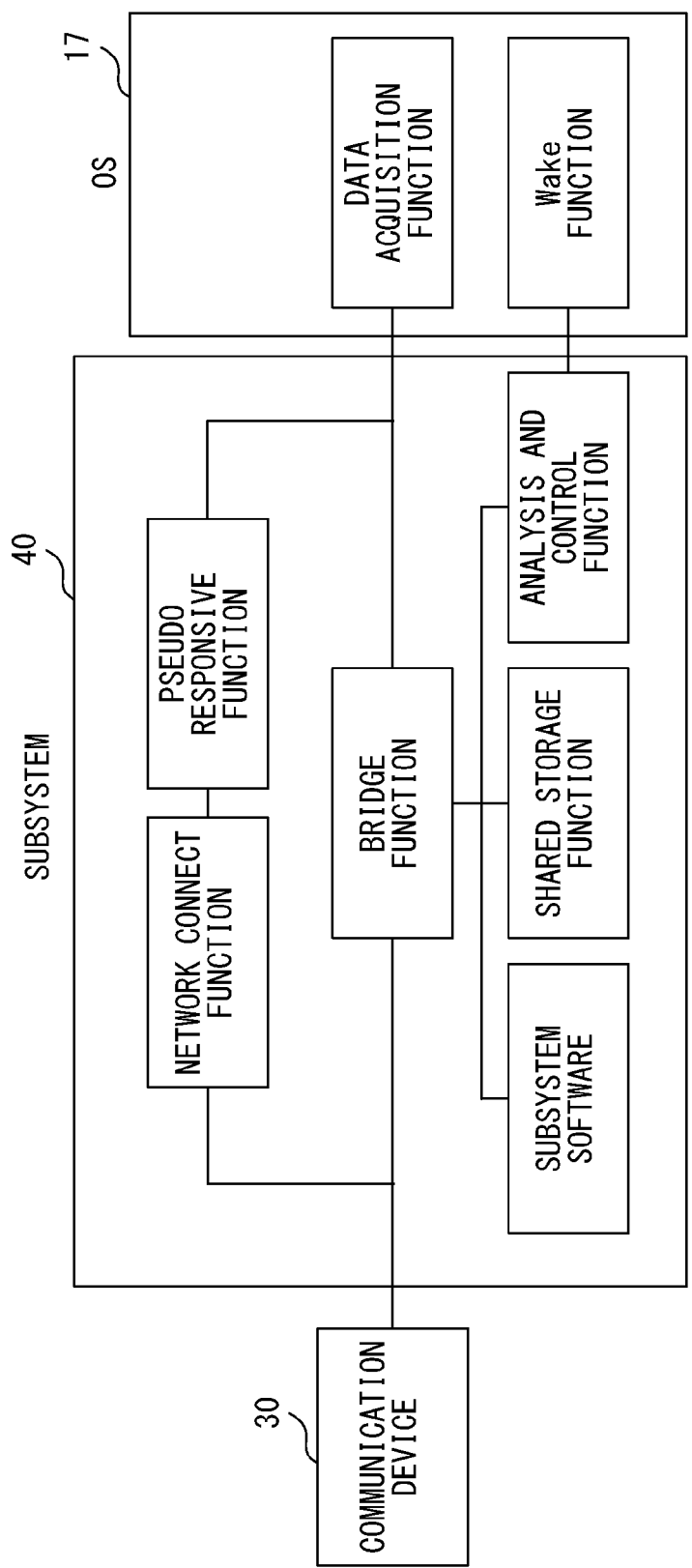
FIG. 5 illustrates the functions provided by a subsystem 40 and an OS 17.

FIG. 5 illustrates the functions provided by the subsystem 40 and the OS 17.

In FIG. 5, the subsystem 40 is provided with a network connect function, a pseudo responsive function, a bridge function, an analysis and control function, and a shared storage function, and includes a subsystem software. The OS 17 is provided with a data acquisition function and a Wake function.

The network connect function manages the network connection. The pseudo responsive function makes a pseudo response in response to a request from the OS 17, thereby notifying the OS 17 of a network connection status. The bridge function provides the OS 17 with the network communication. The analysis and control function analyzes the message (communication data) brought to the subsystem 40 side by the bridge function, and performs a process within the subsystem 40 when the analyzed message is in a specified data format. The analysis and control function drives a GPIO (General Purpose Input Output) to provide the OS 17 with notification when, for example, a specific command is received. For example, the OS 17 is provided with "Wake" when necessary. The OS 17 may use such a notification as a trigger to alter the operation. The subsystem software provides the service in which the network is used.

The shared storage function provides the OS 17 with the communication data. The Wake function turns on the CPU 11 according to a request from the subsystem 40, thereby making the OS 17 operable. The data acquisition function monitors and manages the communication data stored by the shared storage function.

Note that the network connect function, the pseudo responsive function, and bridge function are basic functions required to configure an independent subsystem 40, and the analysis and control function, the shared storage function, and the subsystem software are extensions used by the subsystem 40 to coordinate with the OS 17.

Figure 6:
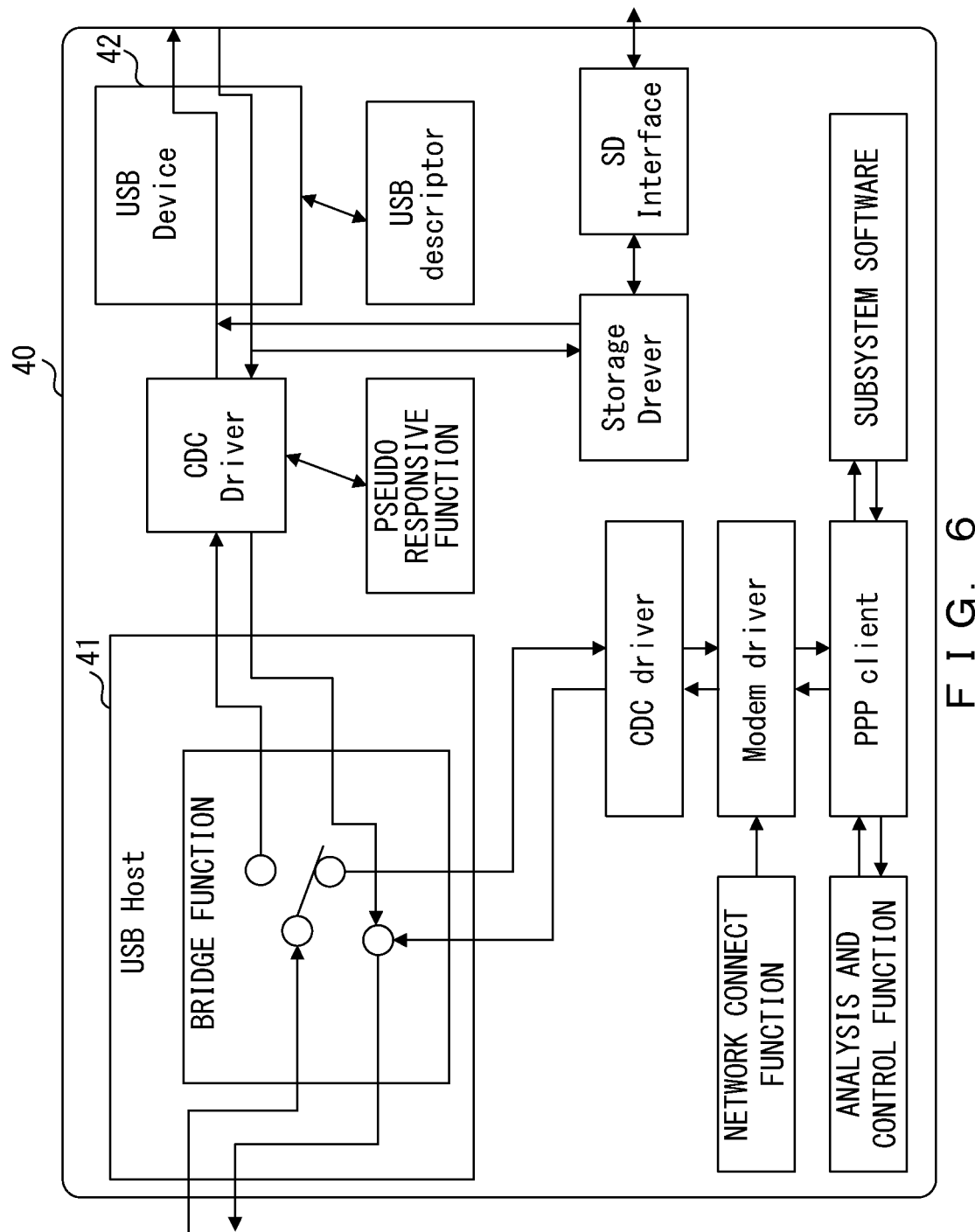
FIG. 6 illustrates the configuration of a subsystem 40.

FIG. 6 illustrates the configuration of the subsystem 40.

The network connection in the subsystem 40 and a pseudo response made by the subsystem 40 when the OS 17 connects to the network will be described with reference to FIG. 6. Note that there are two kinds of pseudo responses, including a pseudo response for the network connection and a pseudo response for a USB Descriptor.

The network connection by the subsystem 40 is implemented such that a connection protocol will be driven when the subsystem 40 starts operating, and the connection is performed by sending and receiving a standard AT command listed in the 3GPP TS27.060 as "Example command sequences for dial-compatibility mode" and a PPP (Point-to-Point-Protocol) command sequence.

When the connection is established as above, the communication between the application software of the subsystem 40 and the network becomes activated. Even when the network is disconnected for some reason, it is configured such that the disconnection will be detected and the connection will be established again, thereby maintaining the network connection at all times.

The pseudo response functions when network connection or disconnection is issued by the OS 17. The subsystem 40 makes a pseudo response in response to the standard AT command and PPP command issued by the OS 17. In particular, when a standard command is issued by the network connection software of the OS 17, the subsystem 40 sends out a prepared pseudo response. Accordingly, the OS 17 will be unaware of the existence of the subsystem 40. When the network connection is established, the subsystem 40 passes the information (e.g., an IP address) without any alterations as a parameter of the network. It is configured such that when the OS 17 establishes the network connection, the network will be available to the bridge function by combining the paths between the OS 17 and the subsystem 40, as will be described later.

When the OS 17 disconnects the communication, a prepared pseudo response is returned in response to the disconnection command issued by the OS 17, thereby simulating the disconnection from the network at the OS 17. Even in this state, the communication between the subsystem 40 and the network is maintained.

Next, the bridge function will be described.

The bridge function herein includes the function in which the communication data sent from an external network is distributed to the OS 17 and the subsystem 40 and the function in which the data sent from the OS 17 and the subsystem 40 is integrated and sent to the network, as illustrated in FIG. 6. This bridge function may be realized in two ways, as will be described later in detail.

Next, the operations in the present invention will be described.

Figure 7:
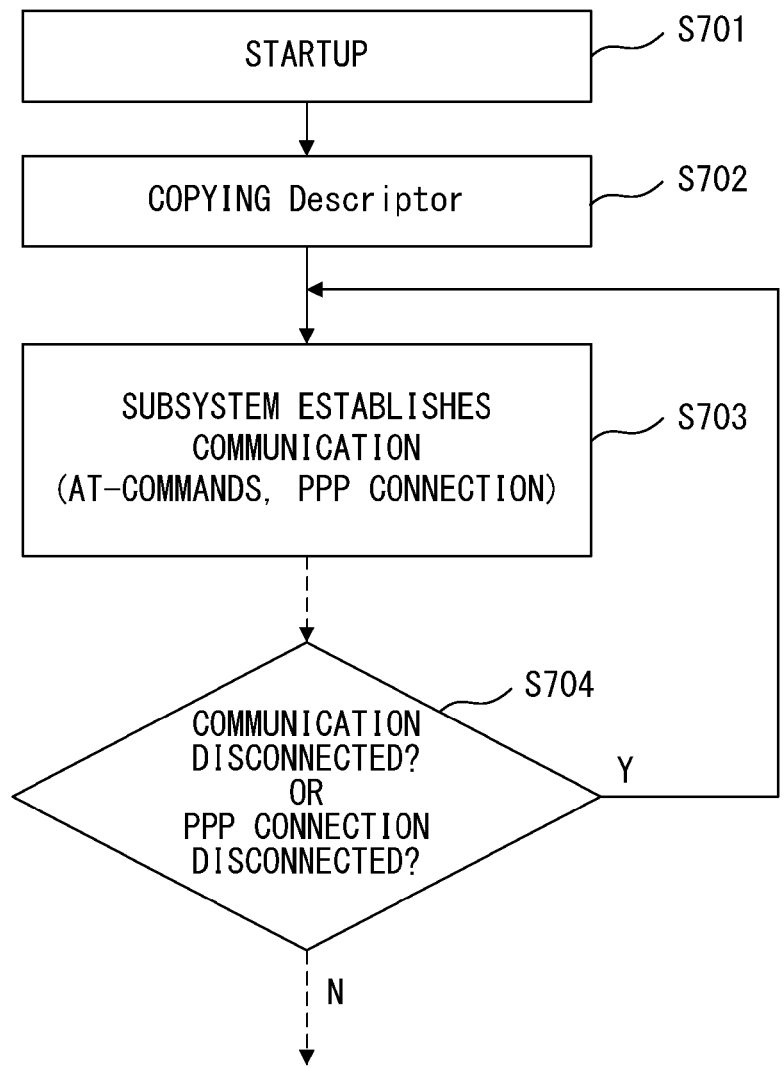
FIG. 7 is a flowchart of the processes performed upon startup of a subsystem 40 according to the first embodiment.

FIG. 7 is a flowchart of the processes performed upon startup of the subsystem 40 according to the first embodiment.

Firstly, when the subsystem 40 starts operating in step S701, a descriptor in which the information of the communication device 30 is stored is read from the memory of the USB device 33 in the communication device 30 and the descriptor is copied to the memory of the USB device 42 in the subsystem 40 in step S702. Accordingly, it becomes possible for the subsystem 40 to be virtually recognized by the PC 100 as the communication device 30.

Then, in step S703, the subsystem 40 tries to establish communication with the carrier network 200 through the communication device 30 by using AT commands and a PPP connection including authentication. In other words, the subsystem 40 confirms the established communication by receiving Ack(OK) to AT commands or a PPP connection from the carrier network 200 through the communication device 30.

Although the description is simplified herein, in detail, command sequences of the PPP (Point to Point Protocol) in a dial compatibility mode defined in 3GPP TS 27.060 V3.5.0 (2001-03) are used as a communication protocol when 3G communication is assumed.

Subsequently, in step S704, when the communication is disconnected or when the PPP connection is interrupted, the subsystem 40 detects, for example, the notification of disconnection from the communication device 30, and serves to maintain the communication at all times by reestablishing the connection.

Figure 8:
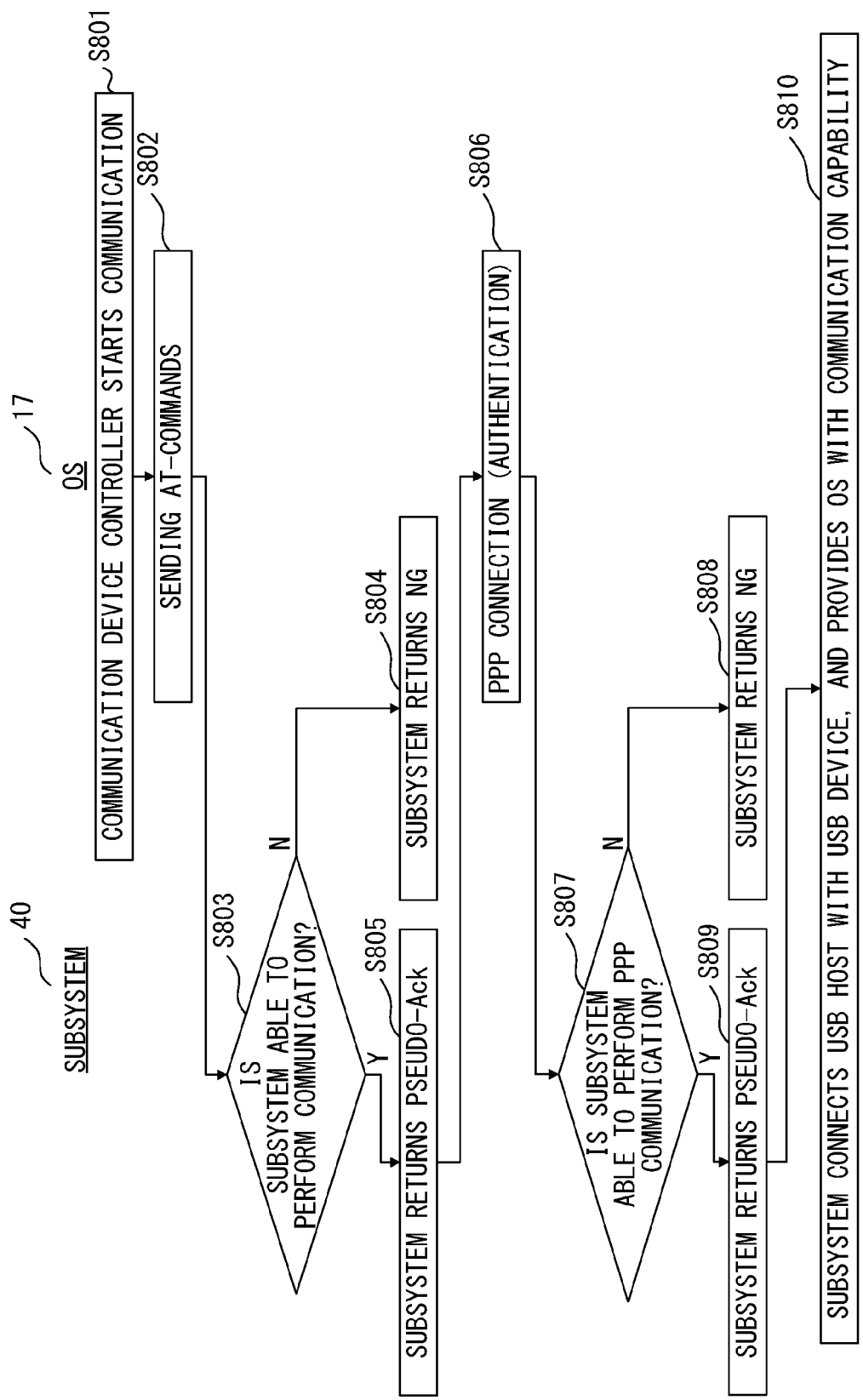
FIG. 8 is a flowchart of the processes when communication is performed between a subsystem 40 and an OS 17.

FIG. 8 is a flowchart of the processes when communication is performed between the subsystem 40 and the OS 17.

Firstly, the OS 17 of the PC 100 starts communication in step S801 by using the communication device controller 18, and sends a Connect (connection request) to the subsystem 40 by using AT commands in step S802.

FIG. 9 illustrates an example of a packet of an AT command sent from the OS 17 to the subsystem 40.

In FIG. 9, "message header" is the information indicating that the packet is of the AT commands sent from the OS 17 of the PC 100 to the subsystem 40. "Subsystem ID" is an ID to identify the subsystem 40 to which the packet is to be sent. "Server ID" is an ID to identify the PC 100 to which the packet is sent.

"Sequence number" is a unique ID to identify the packet designated by the PC 100. "PC Wake flag" is a flag that indicates whether or not the subsystem 40 that has received the (message) packet should wake up the PC 100, and in particular, whether or not the CPU 11 of the PC 100 should be turned on such that the OS 17 will be operable. For example, the PC 100 is woken up when the flag indicates "1", and Wake is not issued to the PC 100 when the flag indicates "0".

"Deletion flag" is a flag that indicates whether or not the subsystem 40 that has received the packet should perform deletion. The "deletion flag" includes a flag that indicates whether or not the nonvolatile memory (i.e., an SD memory card 181 (see FIG. 18 and FIG. 19)) in the subsystem 40 should be deleted, and a flag that indicates whether or not the HDD of the PC 100 should be deleted. In regard to the deletion of the HDD of the PC 100, software such as the BIOS of the PC 100 checks the flag and deletes the HDD after the PC 100 is woken up.

"Download flag" is a flag that indicates whether or not the subsystem 40 should perform downloading. For example, when the flag indicates "1", "download address information" is identified and a download is performed. When the flag indicates "0", a download is not performed. The "download address information" includes the information indicating where a program or data is to be downloaded from when the "download flag" indicates "1". For example, two or more URLs are included in the information, and each URL indicates a module that makes up a program.

Return to the description with respect to FIG. 8.

When Connect (connection request) is sent from the OS 17 to the subsystem 40 in step S802, the subsystem 40 determines whether or not the communication with the carrier network 200 has been established through the communication device 30 in step S803. In other words, the subsystem 40 determines whether the communication has been established with the carrier network 200 in accordance with whether Ack of OK to AT commands has been received upon startup from the carrier network 200 through the communication device 30.

When the communication between the subsystem 40 and the carrier network 200 is not established (step S803: N), in step S804, the subsystem 40 returns NG by using the controller 26.

On the other hand, when the communication between the subsystem 40 and the carrier network 200 is established (step S803: Y), in step S805, the subsystem 40 returns pseudo-Ack (OK) by using the controller 26.

FIG. 10 illustrates an example of a packet of a reply command sent from the subsystem 40 to the OS 17.

In FIG. 10, "ACK" indicates "OK" or "NG" information as a pseudo-Ack when the subsystem 40 executes a send packet as illustrated in FIG. 9. In the case of "NG", information that indicates the details of the problem is returned.

Return to the description with respect to FIG. 8.

When the communication between the subsystem 40 and the carrier network 200 has been established and pseudo-Ack (OK) is returned by the controller 26 in step S805, the OS 17 performs a PPP connection including authentication in step S806 by using the communication device controller 18.

Next, after the controller 26 of the subsystem 20 receives a PPP connection request, the subsystem 40 determines whether the PPP connection with the carrier network 200 through the communication device 30 is possible or not in step S803. In other words, the subsystem 40 determines whether the PPP connection with the carrier network 200 is possible or not depending on whether the Ack of OK to the PPP connection request has been received upon startup from the carrier network 200 through the communication device 30.

When it is determined that the PPP connection between the subsystem 40 and the carrier network 200 is not possible (step S807: N), the subsystem 40 returns NG by using the controller 26 in step S808.

On the other hand, when it is determined that the PPP connection between the subsystem 40 and the carrier network 200 is possible (step S807: Y), in step S809, the subsystem 40 uses the controller 26 and returns pseudo-Ack(OK) as a pseudo response, like the carrier network 200 does, according to a PPP sequence.

When the PPP connection between the subsystem 40 and the carrier network 200 is possible and pseudo-Ack(OK) is returned by the controller 26, in step S810, the subsystem 40 connects the USB host 41 with the USB device 42, and provides the OS 17 with the communication capability with the carrier network 200.

Figure 11:
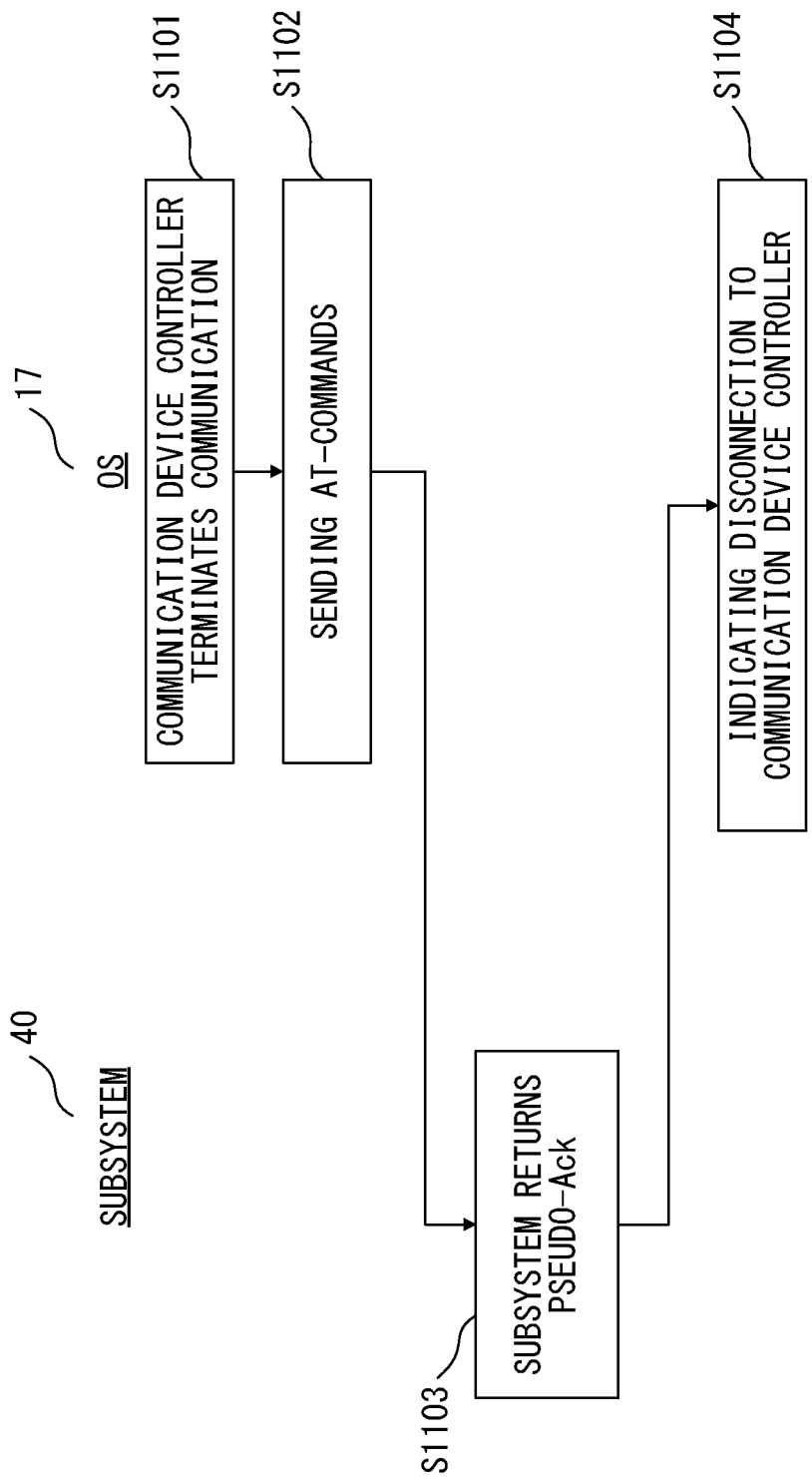
FIG. 11 is a flowchart of the processes of the communication disconnection between a subsystem 40 and an OS 17.

FIG. 11 is a flowchart of the processes of the communication disconnection between the subsystem 40 and the OS 17.

Firstly, when the communication device controller 18 of the PC 100 terminates communication in step S1101 due to the termination of communication by an operation by a user, the OS 17 of the PC 100 issues an AT command of Disconnect (disconnection request) in step S1102 by using the communication device controller 18.

Then, in step S1103, the subsystem 40 returns pseudo-Ack (OK) in response to a Disconnect request regardless of whether the communication with the carrier network 200 has been established through the communication device 30. Even in cases where the subsystem 40 maintains communication with the carrier network 200 through the communication device 30, the subsystem 40 does not actually terminate the connection according to a Disconnect request.

Then, in step S1104, the OS 17 indicates a disconnection on the display device 12 in response to the Ack(OK) sent to the communication device controller 18.

Figure 12:
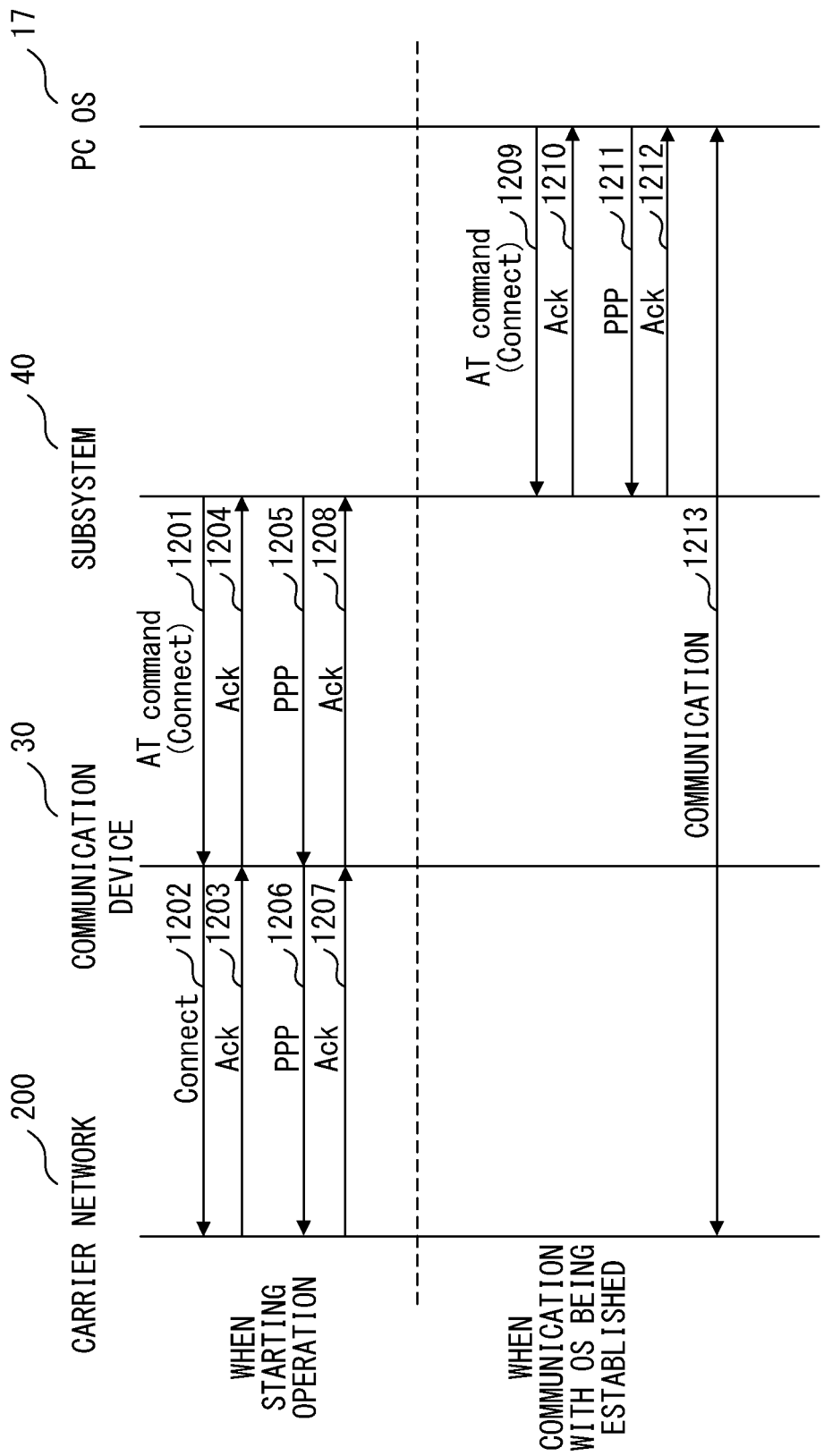
FIG. 12 illustrates a sequence of communication to be established between a PC 100 and a carrier network 200.

FIG. 12 illustrates a sequence of communication to be established between the PC 100 and the carrier network 200.

When the subsystem 40 starts operating, the subsystem 40 sends an AT command (Connect) to the communication device 30 (1201). Upon receipt of the AT command, the communication device 30 sends a Connect signal to the carrier network 200 (1202).

The carrier network 200 returns Ack(OK) to a Connect command to the communication device 30 (1203), and the communication device 30 returns Ack(OK) for the AT command (Connect) to the subsystem 40 (1204).

The subsystem 40 sends a PPP connection request to the communication device 30 (1205). Upon receipt of the PPP connection request, the communication device 30 sends the PPP connection request to the carrier network 200 (1206).

The carrier network 200 returns Ack(OK) to the PPP connection request to the communication device 30 (1207), and the communication device 30 returns Ack(OK) to the PPP connection request to the subsystem 40 (1208).

When communication between the carrier network 200 and the OS 17 is to be established, the OS 17 of the PC 100 sends an AT command of Connect(connection request) to the subsystem 40 (1209), and the subsystem 40 returns pseudo-Ack(OK) (1210).

The OS 17 of the PC 100 sends a PPP connection request to the subsystem 40 (1211), and the subsystem 40 returns pseudo-Ack(OK) (1212). Accordingly, the subsystem 40 connects the USB host 41 with the USB device 42, and the OS 17 establishes the communication with the carrier network 200 (1213).

Figure 13:
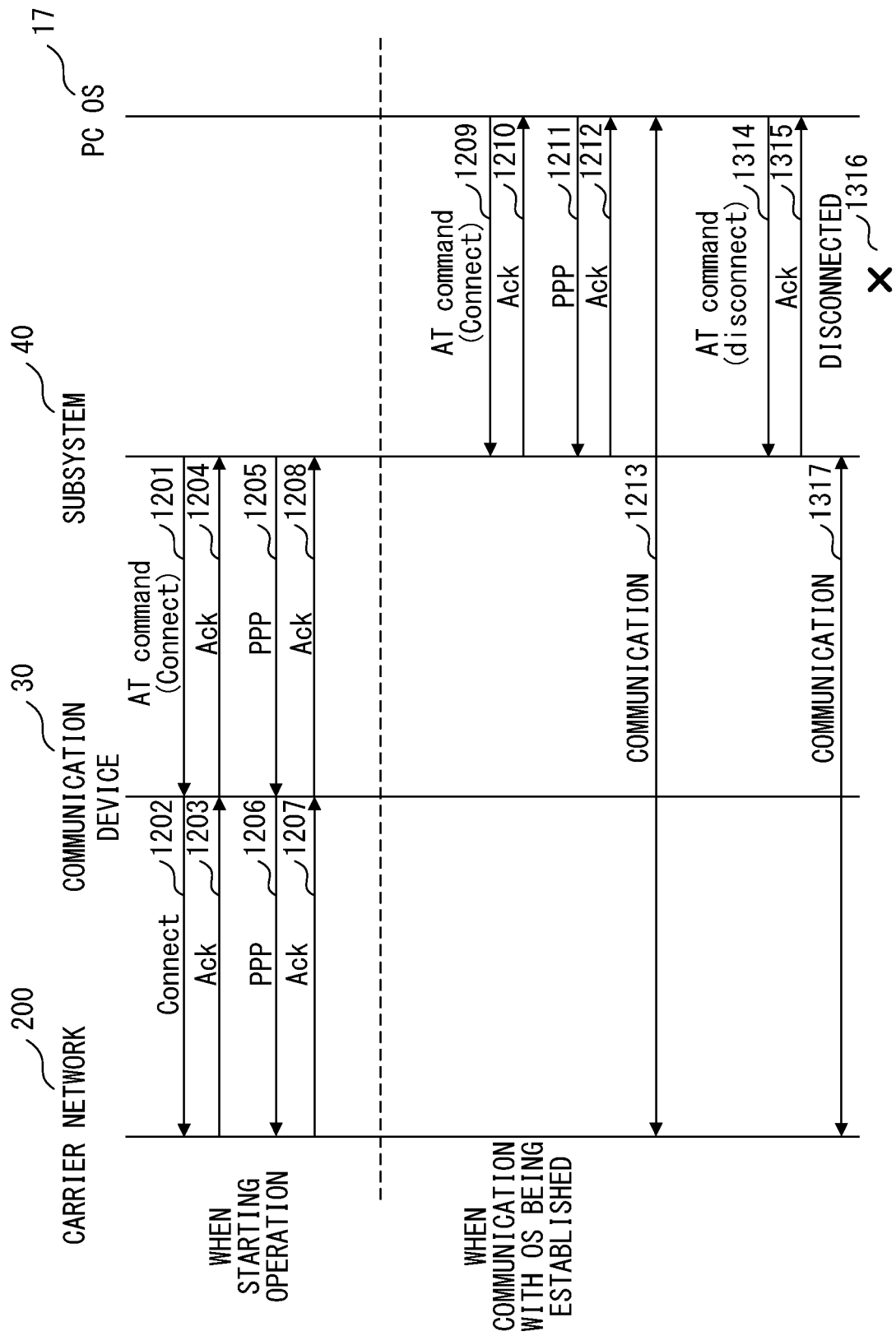
FIG. 13 illustrates a sequence of communication to be disconnected between a PC 100 and a carrier network 200.

FIG. 13 illustrates a sequence of communications to be disconnected between the PC 100 and the carrier network 200.

As described above with reference to FIG. 12, the OS 17 establishes the communication with the carrier network 200 (1201-1213). Then, the OS 17 of the PC 100 sends an AT command (Disconnect) to the subsystem 40 (1314). Upon the receipt of the AT command, the subsystem 40 returns Ack (OK) to the OS 17 of the PC 100 (1315).

Accordingly, the communication between the OS 17 of the PC 100 and the subsystem 40 is disconnected (1316). However, the communication between the carrier network 200 and the subsystem 40 is still maintained (1317).

Figure 14:
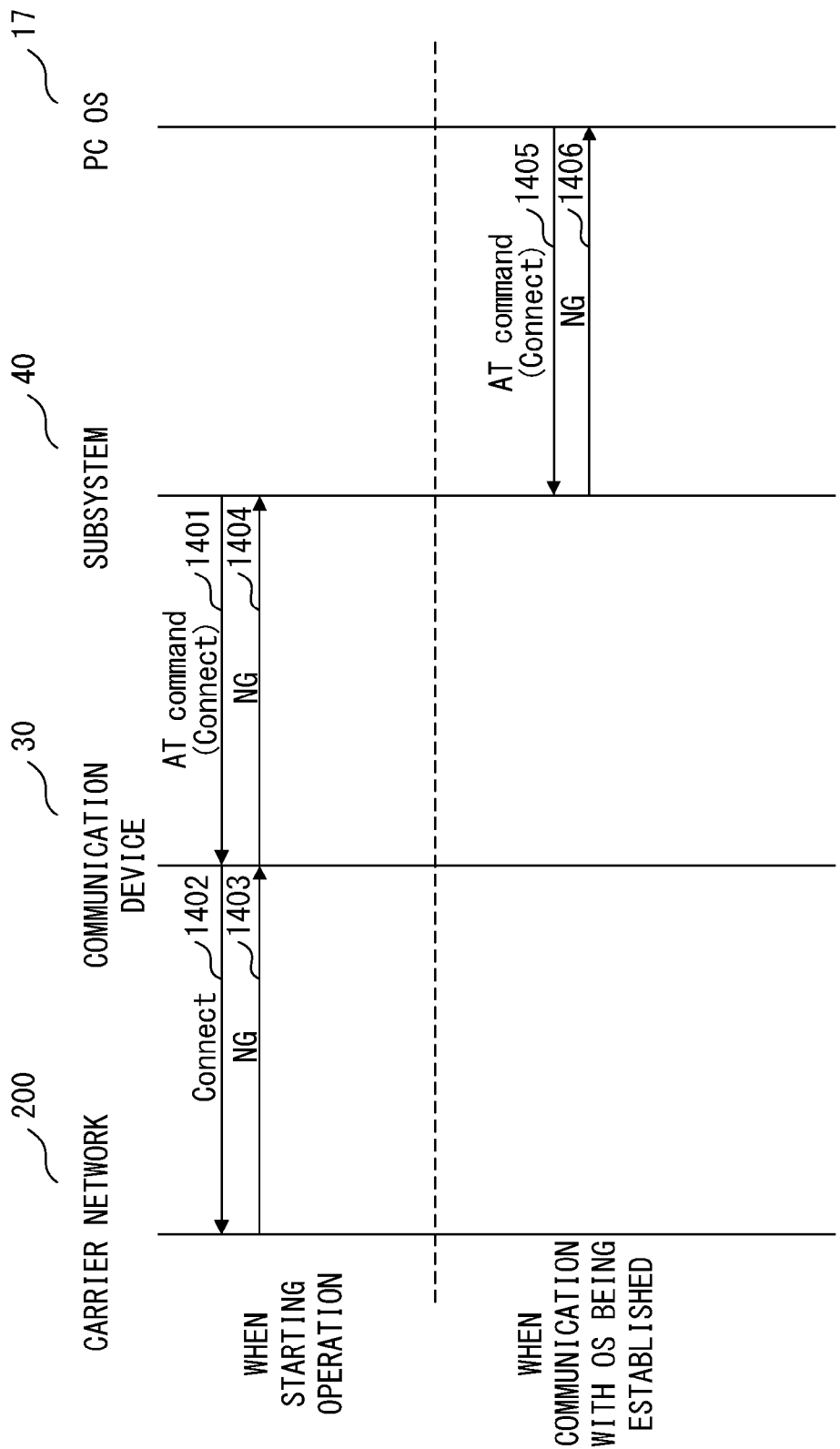
FIG. 14 illustrates a sequence of communication when connection is not established between a PC 100 and a carrier network 200.

FIG. 14 illustrates a sequence of a communication when connection is not established between the PC 100 and the carrier network 200.

When the subsystem 40 starts operating, the subsystem 40 sends an AT command (Connect) to the communication device 30 (1401). Upon receipt of the AT command, the communication device 30 sends a Connect command to the carrier network 200 (1402).

The carrier network 200 returns Ack(OK) to an AT command to the communication device 30 (1403), and the communication device 30 returns Ack(NG) to the AT command to the subsystem 40 (1404).

When communication between the subsystem 40 and the OS 17 is to be established, the OS 17 of the PC 100 sends an AT command of Connect(connection request) to the subsystem 40 (1406), and the subsystem 40 returns Ack(NG) (1407). Accordingly, the communication connection between the PC 100 and the carrier network 200 is not established.

Figure 15:
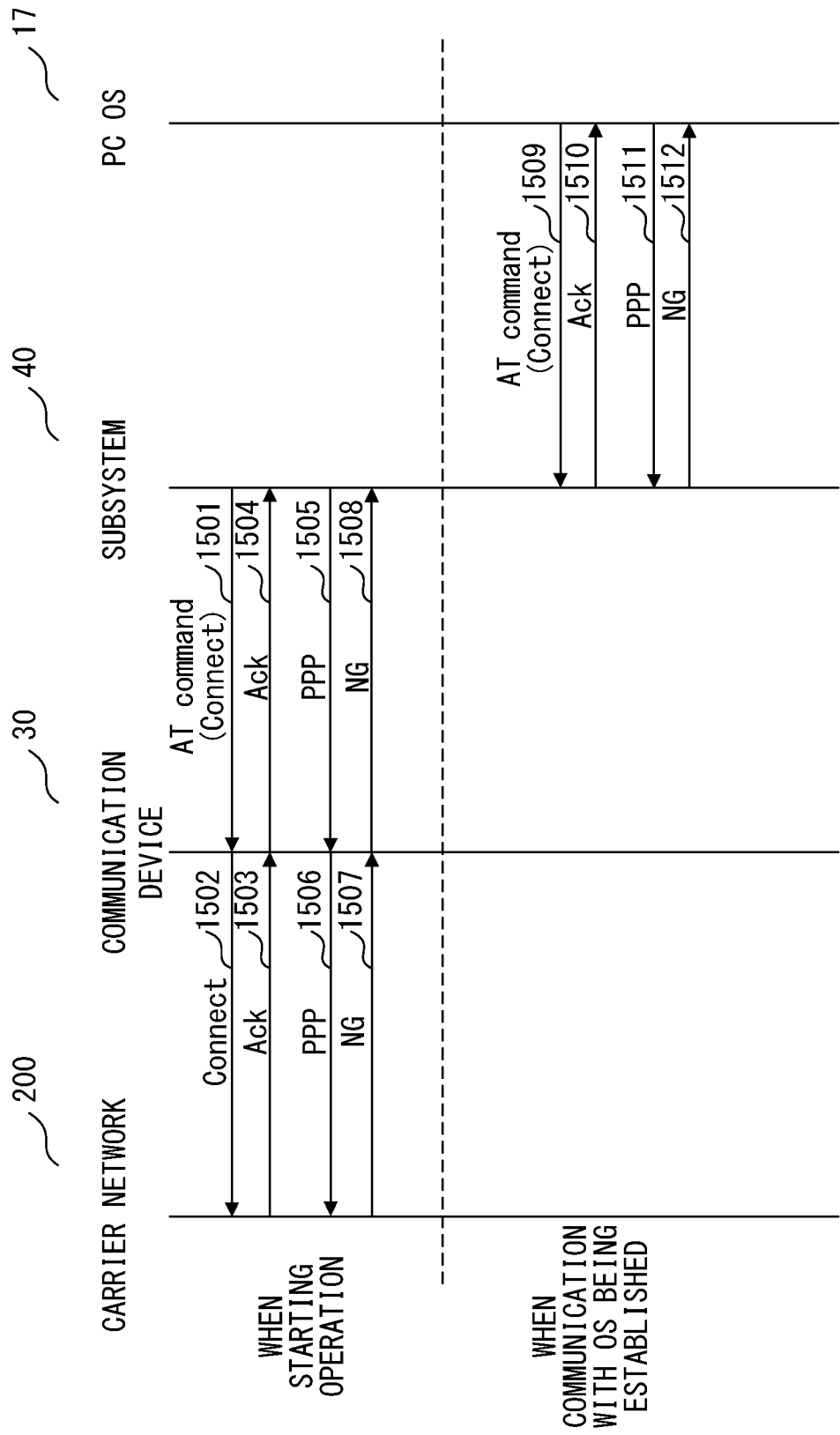
FIG. 15 illustrates a sequence when a PPP connection is not established between a PC 100 and a carrier network 200.

FIG. 15 illustrates a sequence when the PPP connection is not established between the PC 100 and the carrier network 200.

When the subsystem 40 starts operating, the subsystem 40 sends an AT command (Connect) to the communication device 30 (1501). Upon the receipt of the AT command, the communication device 30 sends a Connect command to the carrier network 200 (1502).

The carrier network 200 returns Ack(OK) for an AT command to the communication device 30 (1503), and the communication device 30 returns Ack(OK) to the AT command to the subsystem 40 (1504).

Next, the subsystem 40 sends a PPP connection request to the communication device 30 (1505). Upon receipt of the PPP connection request, the communication device 30 sends the PPP connection request to the carrier network 200 (1506).

The carrier network 200 returns Ack(NG) to the PPP connection request to the communication device 30 (1507), and the communication device 30 returns Ack(NG) to the PPP connection request to the subsystem 40 (1508).

When communication between the subsystem 40 and the OS 17 is to be established, the OS 17 of the PC 100 sends an AT command of Connect(connection request) to the subsystem 40 (1509), and the subsystem 40 returns Ack(OK) (1510).

The OS 17 of the PC 100 sends a PPP connection request to the subsystem 40 (1511), and the subsystem 40 returns Ack (NG) (1512). Accordingly, the communication connection between the PC 100 and the carrier network 200 is not established.

As described above, it is possible for the OS 17 to perform communication with the external carrier network 200 without altering the communication device controller 18 of the OS 17 even when the subsystem 20 is arranged between the OS 17 of the PC 100 and the communication device 30.

(Second Embodiment)

In addition to the service in which downloading is performed through the carrier network 200 when the CPU 11 of the PC 100 is in a power source turned-off state or a suspended state, it is desirable that the subsystem 40 secure a communication path to the subsystem 40 even when the PC 100 is operating and performing communication, and thereby detecting and processing the push notification to the subsystem 40.

FIG. 16 illustrates a general outline of a personal computer according to the second embodiment.

In comparison with the subsystem 40 according to the first embodiment, a subsystem 50 of FIG. 16 according to the second embodiment further includes a buffer unit 27, a copy unit 28, and a specific port data extraction unit 29.

The buffer unit 27 temporarily stores the communication data between the communication device 30 and the communication device controller 18. The copy unit 28 copies and stores the communication data stored in the buffer unit 27. The specific port data extraction unit 29 detects communication data that corresponds to a specific port of the subsystem 50 from the communication data stored in the copy unit 28, and extracts the detected communication data from the copy unit 28.

Accordingly, the subsystem 50 provides a communication path by which the communication data sent from the communication device 30 is sent to the PC 100 side via the buffer unit 27 without any alterations. In other words, the buffer unit 27 relays communication data between the communication device 30 and the communication device controller 18.

The subsystem 50 may also provide the PC 100 with communication capability by communicating with the communication device 30 with little communication time lag even when the CPU 11 of the PC 100 is in a power source turned-off state or a suspended state. When the CPU 11 of the PC 100 is in a power source turned-off state or a suspended state, a connection manager of the PC 100 (the OS 17) does not function and the Internet communication is not used by a user, and thus there is no communication performed via the subsystem 50. Accordingly, there is no communication performed by the PC 100 (the OS 17) via the buffer unit 27.

Figure 17:
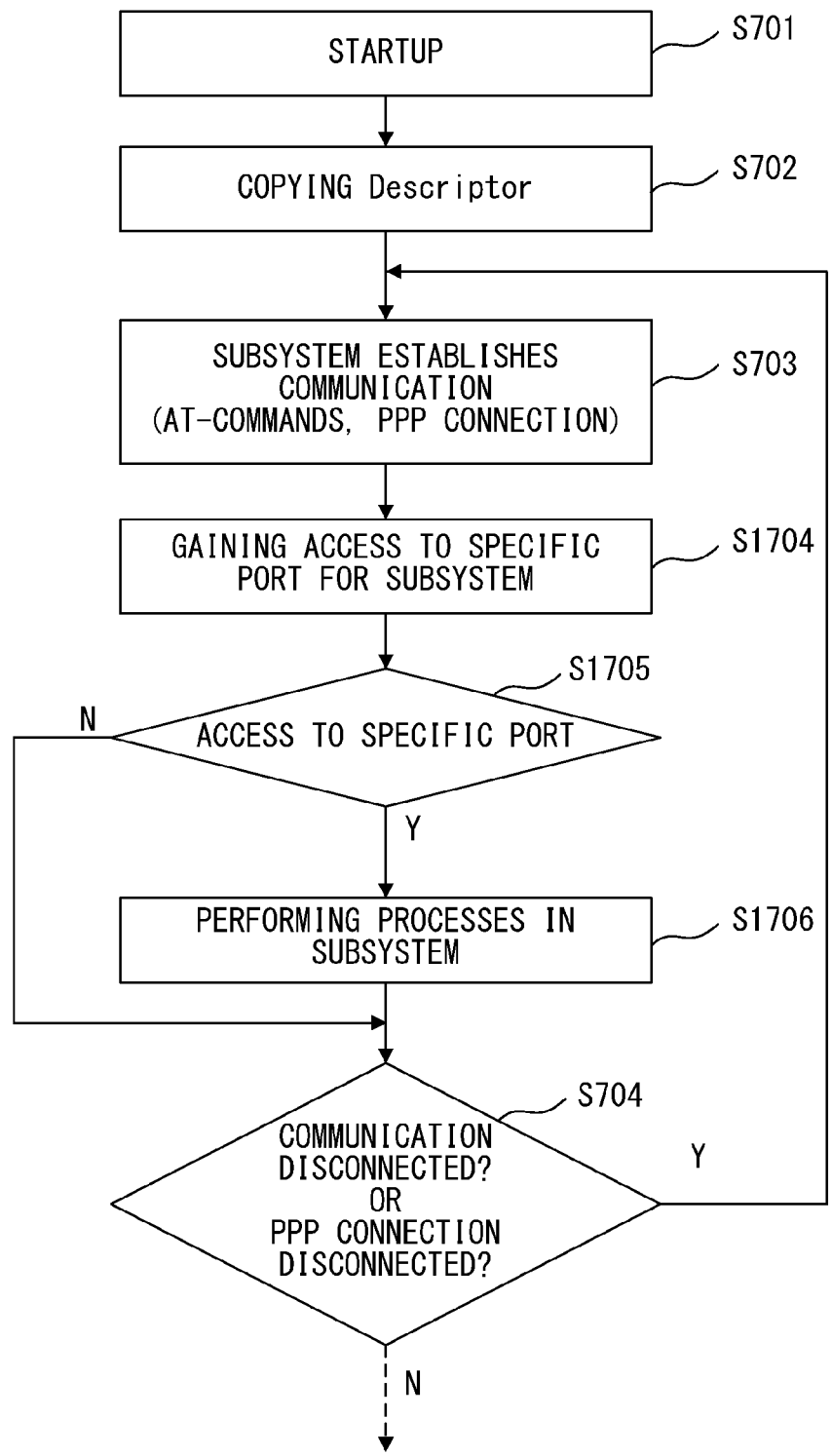
FIG. 17 is a flowchart of the processes performed upon startup of a subsystem 40 according to the second embodiment.

FIG. 17 is a flowchart of the processes performed upon startup of the subsystem 40 according to the second embodiment.

Firstly, in a similar manner to the processes performed upon startup of the subsystem 40 in the first embodiment described above with reference to FIG. 7, when the subsystem 40 starts operating in step S701, a descriptor in which the information of the communication device 30 is stored is read from the memory of the USB device 33 in the communication device 30 and the descriptor is copied to the memory of the USB device 42 in the subsystem 40 in step S702. Then, in step S703, the subsystem 40 tries to establish communication with the carrier network 200 through the communication device 30 by using AT commands and a PPP connection including authentication.

Next, in step S1704, an access to a specific port for the subsystem 50 is gained in step S1705, and whether or not an access to a specific port has been made is determined.

When an access to a specific port was made (step S1705: Y), processes are performed in step S1706 by using an application of the subsystem 50.

Subsequently, in a similar manner to the processes performed upon startup of the subsystem 40 in the first embodiment described above with reference to FIG. 7, in step S704, when the communication is disconnected or when the PPP connection is interrupted, the subsystem 40 detects, for example, the notification of disconnection from the communication device 30, and serves to maintain the communication at all times by reestablishing the connection.

Accordingly, it becomes possible to transparently provide a service that is given externally through the carrier network 200 even when the CPU 11 of the PC 100 is in a power source turned-off state or a suspended state.

Next, the two modes of the bridge function will be described.

Figure 18:
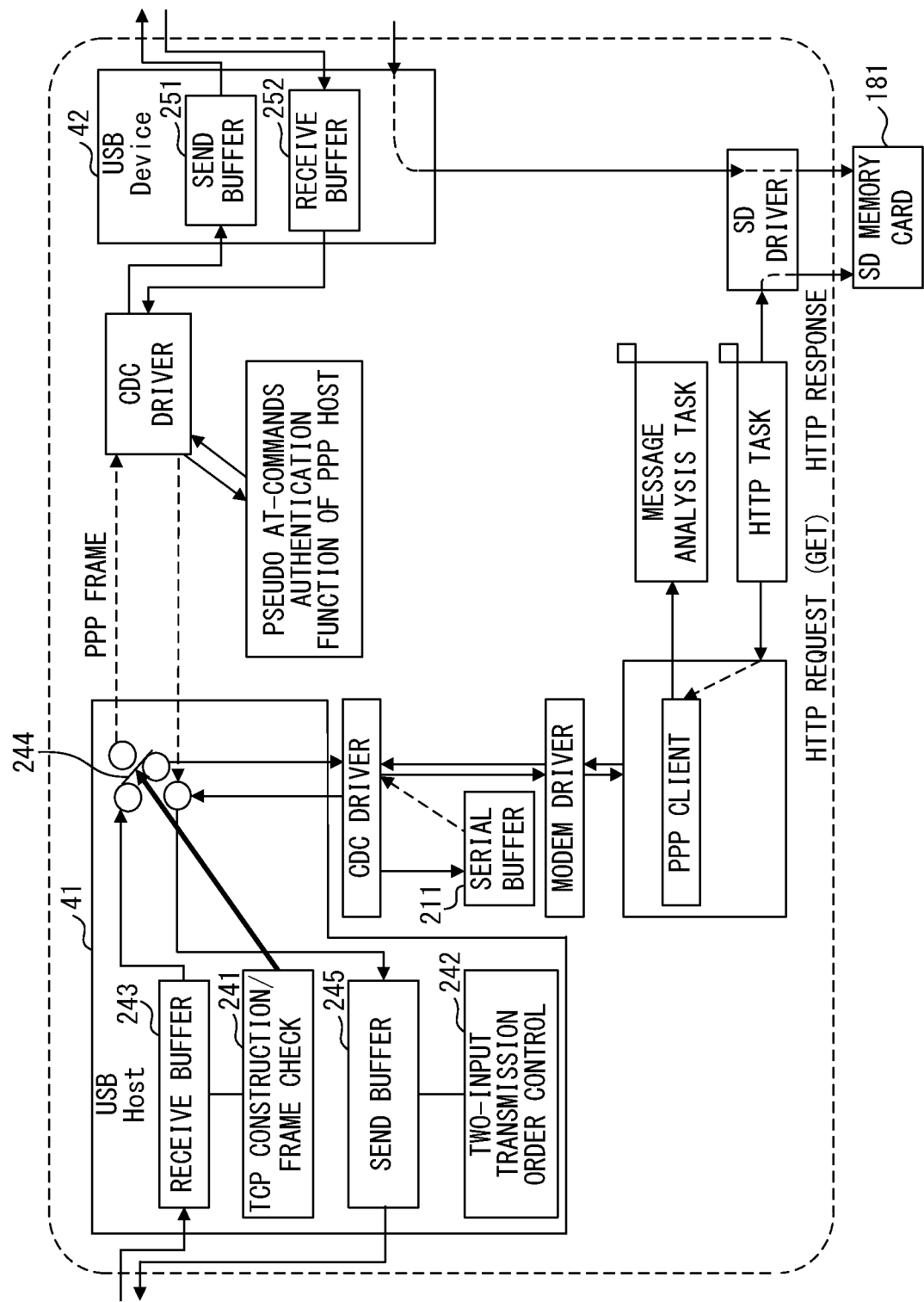
FIG. 18 illustrates the first mode of a bridge function.

FIG. 18 illustrates the first mode of the bridge function.

As described above, the bridge function includes the function in which the communication data sent from an external network is distributed to the OS 17 of the PC 100 and the subsystem 40 and the function in which the data sent from the OS 17 and the subsystem 40 is integrated and sent to the network. In the first mode, the USB host 41 further includes the two functions of a "TCP Construction/Frame Check" function 241 and a "two-input transmission order control" function 242.

The "TCP Construction/Frame Check" function 241 performs TCP construction and Frame Check together with a "Receive Buffer" 243 of the USB host 41. Then, a port number is analyzed to determine whether the incoming communication data is oriented to the OS 17 or the subsystem 40. A "transmit switch" 244 is inclined toward the subsystem 40 side when an access to a specific port for the subsystem 40 is recognized, and the "transmit switch" 244 is inclined toward the OS 17 side (i.e., the PC 100 side) at all other times.

The "two-input transmission order control" function 242 is used to appropriately compile an input from the USB device 42 and an input from the subsystem 40, and to output the compiled input to the network side. For this purpose, a "Receive Buffer" 252 and a "serial buffer" 211 are provided as two buffers that hold the data sent from the OS 17 and the subsystem 40, respectively.

The "two-input transmission order control" function 242 controls which buffer ("Receive Buffer" 252 or "serial buffer" 211) data is to be obtained from when the USB host 41 fetches communication data from the "Receive Buffer" 252 and "serial buffer" 211. When only one of the "Receive Buffer" 252 and "serial buffer" 211 contains communication data, that communication data is sent to the network side. When both the "Receive Buffer" 252 and "serial buffer" 211 contain communication data, whether the communication data that is currently being transmitted from the USB device 42 or the subsystem 40 to the network side is complete or not is checked. When it is determined that the transmission is not complete, it waits until the transmission of the communication data from the other one (of the subsystem 40 and the USB device 42) becomes complete. Accordingly, the communication data on the other side will not be mixed with the communication data that is being sent to the network side.

Next, the flow of communication data will be described.

Firstly, when a path is assumed from the network to the OS 17 of the PC 100 via the subsystem 40, a USB packet is firstly received by the "Receive Buffer" 243 of the USB host 41. Then, the "TCP Construction/Frame Check" function 241 checks all the communication data (USB packet) for whether there is any port for the subsystem 40. Basically, when a start signal is detected in the communication data (USB packet), a value of a TCP Port is fetched from the PPP packet.

When the value is in conformity with the values specified by the subsystem 40, the path of the "transmit switch" 244 is switched to the subsystem 40 side. When the data is not intended for the subsystem 40, the path is switched to the PC 100 side. The DMA functionality provided for the USB device 42 indicates a "send buffer" 245 of the USB host 41.

Accordingly, when the data being sent to the PC 100 arrives at a "receive buffer" 243 of the USB host 41, the communication data is passed to the PC 100 side via the DMA functionality of the USB device 42.

The information being sent from the PC 100 to the network via the subsystem 40 is placed in a "receive buffer" 252 of the USB device 42, and is passed to a "send buffer" 242 of the USB host 41. At this time, communication data may be sent from the subsystem 40 to the "send buffer" 245 of the USB host 41, and such communication data is also passed to the "send buffer" 245 of the USB host 41.

The "two-input transmission order control" function 242 that operates together with the USB host 41 organizes and sends out these two inputs, thereby controlling these two inputs so as to be sent out to the network in such a manner that the communication data on one side will not be mixed with the communication data on the other side.

Figure 19:
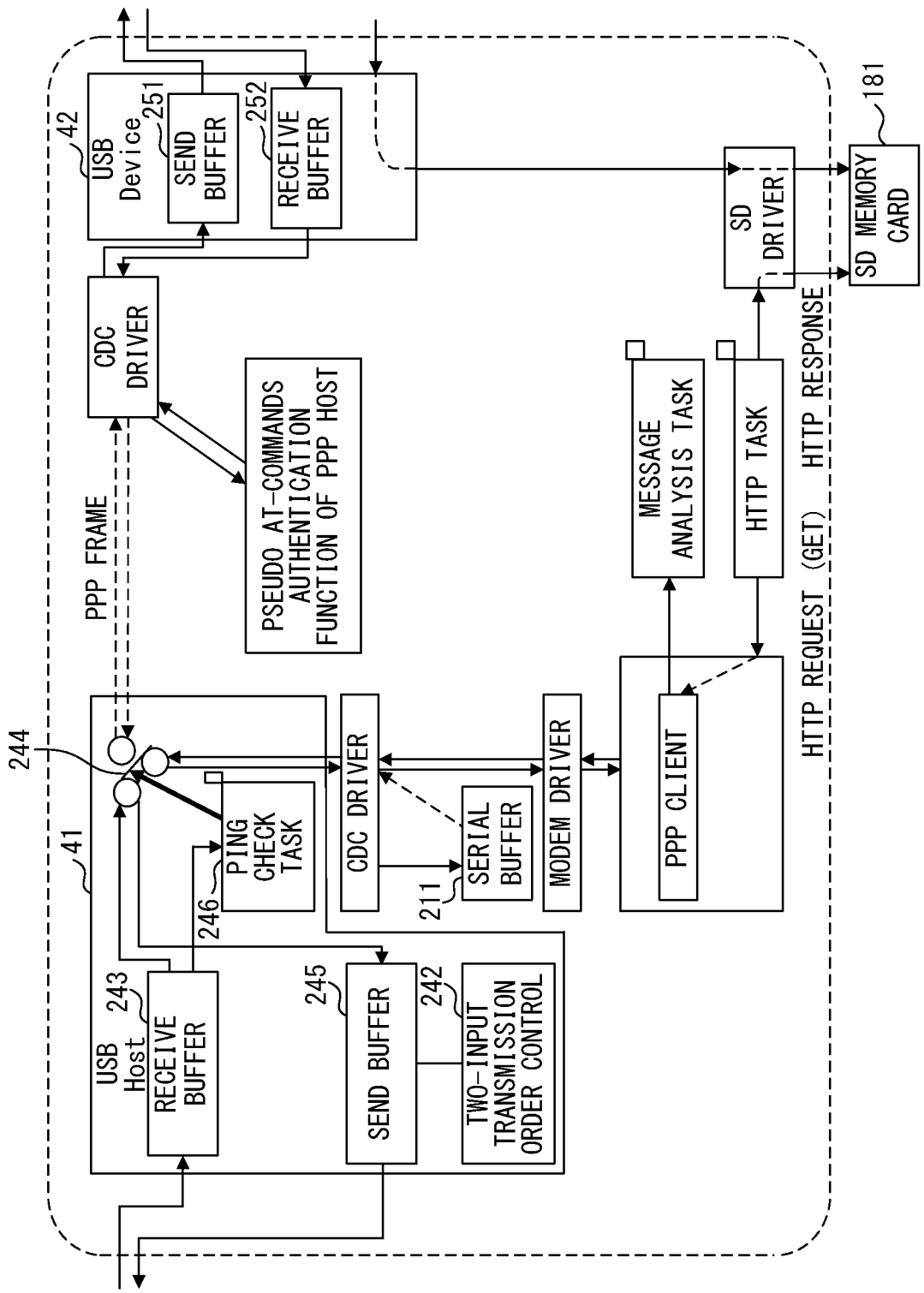
FIG. 19 illustrates the second mode of a bridge function.

FIG. 19 illustrates the second mode of bridge function.

In the second mode, the USB host 41 further includes a "Ping check task" function 246.

The "Ping check task" function 246 regards a specific Ping as a trigger for data transfer to the subsystem 40, and when such data is sent, the "Ping check task" function 246 switches the "transmit switch" 244 of the path to the subsystem 40 side. Normally, the "transmit switch" 244 is inclined toward the PC 100 side, but is switched in the above event. When the processes of the subsystem 40 are complete, the "transmit switch" 244 is returned to the PC 100 side, which is the default position.

Next, the flow of communication data will be described.

When a path is assumed from the network to the PC 100 via the subsystem 40, a USB packet is firstly received by the "Receive Buffer" 243 of the USB host 41. The "Ping check task" function 246 checks the packet data for whether any Ping is included, or checks whether a Ping is intended for the subsystem 40. When the packet data is normal transmission data, the DMA functionality provided for the USB device 42 indicates the "send buffer" 245 of the USB host 41. Accordingly, when the data being sent to the PC 100 arrives at the "receive buffer" 243 of the USB host 41, the communication data is passed to the PC 100 side via the DMA functionality of the USB device 42.

When a Ping to be used to access the subsystem 40 comes, the "transmit switch" 244 of the path is switched to the subsystem 40 side, and after processes are performed by the subsystem 40, the "transmit switch" 244 is returned to the original state.

Some embodiments of the present invention have been described above with reference to the drawings. The embodiments of the present invention described above may be realized as hardware with a functionality of an information processing device or subsystem, or as firmware or software installed on a DSP (Digital Signal Processor) board or a CPU board.

USB devices were taken as an example to describe I/F devices, but no limitation is intended to USB devices, and other kinds of I/F such as PCI (Peripheral Component Interconnect)-Express or CradBus may be used.

Obviously, as long as the functionality is realized, an information processing device or subsystem to which the present invention is applied is not limited to the above embodiments, but may be a discrete device, a system composed of a plurality of devices or an integrated device, or may be a system where processes are performed through the network such as LAN or WAN.

Alternatively, the embodiments of the present invention may be realized by a system comprised of a CPU, a memory such as ROM or RAM, an input device, an output device, an external storage device, a medium drive, and a network connection device that are connected to a bus. In other words, the embodiments of the present invention may be realized as a memory such as ROM or RAM, an external storage device, or a portable recording medium in which a software program that realizes a system according to the embodiments described above is recorded is provided for an information processing device or subsystem, and a computer of the information processing device or subsystem reads and executes the program.

In the above case, the program read from a portable recording medium or the like realizes a novel function of the present invention, and the portable recording medium or the like on which the program is recorded constitutes the present invention.

As a portable recording medium that provides a program, various kinds of recording media that store a program via, for example, a flexible disk, a hard disk, an optical disk, a magneto-optic disk, a CD-ROM, a CD-R, a DVD-ROM, a DVD-RAM, a magnetic tape, a nonvolatile memory card, a ROM card, or a network connection device such as electronic mail and personal computer communications (in other words, communication lines) may be used.

The functionality of the embodiments described above may be realized by executing a program placed into memory by a computer (information processing device). Alternately, the functionality of the embodiments described above may be realized by the actual processing that is partly or entirely performed by the OS or the like that is operating on the computer according to the program instructions.

After a program read from a portable recording medium or a program (data) provided by a program (data) provider is placed into the memory provided for an extension board inserted into the computer or an extension unit connected to the computer, the functionality of the embodiments described above may be realized by the actual processing that is partly or entirely performed by the CPU or the like provided for the extension board or extension unit according to the program instructions.

In other words, the present invention is not limited to the embodiments described above, but various configurations or shapes may be adopted without departing from the spirit or scope of the present invention.

According to the disclosed technique, it becomes possible to achieve an advantageous effect in which the OS 17 may perform communication with the external carrier network 200 without altering the communication device controller 18 of the OS 17 even when the subsystem 20 is arranged between the OS 17 of the PC 100 and the communication device 30.

Moreover, it becomes possible to achieve an advantageous effect in which a service that is given externally through the carrier network 200 may be transparently provided even when the CPU 11 of the PC 100 is in a power source turned-off state or a suspended state.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing device capable of performing external communication through a communication device for performing communication, the information processing device comprising:
   a subsystem arranged between the communication device and a main unit of the information processing device including a central processing unit and an operating system, wherein
   the subsystem temporarily stores communication data between the communication device and the central processing unit when the central processing unit is in a power source turned-off state or a suspended state, and the subsystem transfers the communication data between the communication device and the central processing unit when the central processing unit is in a power source turned-on state,
   the subsystem includes a pseudo responsive unit configured to make a pseudo response, which indicates that the external communication between the main unit and an external carrier network outside of the information processing device has been established, to the main unit, as a substitute for a response by the communication device and as a response to a request of an establishment of the external communication from the main unit, when the external communication with the subsystem has been already established,
   when the subsystem receives from the main unit a request of disconnecting the established external communication between the main unit and the external carrier network, the pseudo responsive unit makes another pseudo response, which indicates that the established external communication between the main unit and the external carrier network has been disconnected, to the main unit, as a substitute for a response by the communication device, still maintaining the established external communication with the subsystem, and
   the subsystem further includes:
      a communication data buffer unit configured to temporarily store communication data between the communication device and the main unit;
      a communication data copy unit configured to copy and store communication data stored in the communication data buffer unit; and
      a specific port data extraction unit configured to determined whether there is any communication data that corresponds to a specific port of the subsystem in the communication data stored in the communication data copy unit, and to extract the communication data that corresponds to the specific port of the subsystem from the communication data copy unit.

2. The information processing device according to claim 1, wherein
   the subsystem comprises,
      a descriptor copy unit configured to read from the communication device a descriptor in which information of the communication device is stored when the subsystem starts operating, and to store the descriptor in an internal memory.

3. The information processing device according to claim 1, wherein
   the communication data buffer unit relays the communication data between the communication device and the communication device control unit.

4. The information processing device according to claim 1, wherein
   the subsystem communicates with the communication device even when the central processing unit is in a power source turned-off state or a suspended state.

5. A subsystem arranged between an information processing device capable of performing external communication through a communication device for performing communication and the communication device, the subsystem comprising:
   a controller configured to store communication data between the communication device and a central processing unit provided for the information processing device when the central processing units is a power source turned-off state or a suspended state, and to transfer the communication data between the communication device and the central processing unit when the central processing unit is in a power source turned-on state; and
   a pseudo responsive unit configured to make a pseudo response, which indicates that the external communication between the information processing device and a external carrier network outside of the information processing device has been established, to the information processing device, as a substitute for a response by the communication device and as a response to a request of an establishment of the external communication from the information processing device, when the external communication with the subsystem has been already established, wherein
   when the subsystem receives from the information processing device a request of disconnecting the established external communication between the information processing device and the external carrier network, the pseudo responsive unit makes another pseudo response, which indicates that the established external communication between the information processing device and the external carrier network has been disconnected, to the information processing device, as a substitute for a response by the communication device, still maintaining the established external communication with the subsystem, and
   the subsystem further includes:
      a communication data further unit configured to temporarily store communication data between the communication device and the information processing device;
      a communication data copy unit configured to copy and store the communication data stored in the communication data buffer unit; and
      a specific port data extraction unit configured to determine whether there is any communication data that corresponds to a specific port of the subsystem in the communication data stored in the communication data copy unit, and to extract the communication data that corresponds to the specific port of the subsystem from the communication data copy unit.

6. The subsystem according to claim 5, further comprising:
   a descriptor copy unit configured to read from the communication device a descriptor in which information of the communication device is stored when the subsystem starts operating, and to store the descriptor in an internal memory.

7. An information processing method causing a computer of a subsystem arranged between an information processing device capable of performing external communication through a communication device for performing communication and the communication device to execute a process, the process comprising:

temporarily storing communication data between the communication device and the central processing unit when a central processing unit provided for the information processing device is in a power source turned-off state or a suspended state;

transferring the communication data between the communication device and the central processing unit when the central processing unit is in a power source turned-on state;

making a pseudo response, which indicates that the external communication between the information processing device and an external carrier network outside of the information processing device has been established, to the information processing device, as a substitute for a response by the communication device and as a response to a request of an establishment of the external communication from the information processing device, when the external communication with the subsystem has been already established;

when the subsystem receives from the information processing device a request of disconnecting the established external communication between the information processing device and the external carrier network, making another pseudo response, which indicates that the established external communication between the information processing device and the external carrier network has been disconnected, to the information processing device, as a substitute for a response by the communication device, still maintaining the established external communication with the subsystem;

temporarily storing communication data between the communication device and the information processing device in a communication data buffer unit included in the subsystem;

copying the communication data stored in the communication data buffer unit;

storing the copied communication data in a communication data copy unit included in the subsystem;

determining whether there is any communication data that corresponds to a specific port of the subsystem in the communication data stored in the communication data copy unit; and extracting the communication data that corresponds to the specific port of the subsystem from the communication data copy unit.

8. The information processing method according to claim 7 causing a computer to execute a process, the process comprising reading a descriptor in which information of the communication device is stored from the communication device when the subsystem starts operating and storing the descriptor on an internal memory.

9. A non-transitory computer-readable recording medium having stored therein an information processing program causing a computer of a subsystem arranged between an information processing device capable of performing external communication through a communication device for performing communication and the communication device to execute a process, the process comprising:

temporarily storing communication data between the communication device and the central processing unit when a central processing unit provided for the information processing device is in a power source turned-off state or a suspended state;

transferring the communication data between the communication device and the central processing unit when the central processing unit is in a power source turned-on state;

making a pseudo response, which indicates that the external communication between the information processing device and an external carrier network outside of the information processing device has been established, to the information processing device, as a substitute for a response by the communication device and as a response to request of an establishment of the external communication from the information processing device, when the external communication with the subsystem has been already established; and when the subsystem receives from the information processing device a request of disconnecting the established external communication between the information processing device and the external carrier network, making another pseudo response, which indicates that the established external communication between the information processing device and the external carrier network has been disconnected, to the information processing device, as a substitute for a response by the communication device, still maintaining the established external communication with the subsystem;

temporarily storing communication data between the communication device and the information processing device in a communication data buffer unit included in the subsystem;

copying the communication data stored in the communication data buffer unit;

storing the copied communication data in a communication data copy unit included in the subsystem;

determining whether there is any communication data that corresponds to a specific port of the subsystem in the communication data stored in the communication data copy unit; and extracting the communication data that corresponds to the specific port of the subsystem from the communication data copy unit.

10. The information processing program according to claim 9 causing a computer to execute a process, the process further comprising reading a descriptor in which information of the communication device is stored from the communication device when the subsystem starts operating and storing the descriptor on an internal memory.

\* \* \* \* \*